United States Patent Office 3,280,076
Patented Oct. 18, 1966

3,280,076
INITIATORS FOR THE POLYMERIZATION OF FORMALDEHYDE
Attilio Palvarini, Milan, Ezio Merluzzi, Cesano Maderno, and Edgardo Horak, Seveso, Italy, assignors to Snia Viscosa Societa Nazionale Industria Applicazioni Viscosa S.p.A., Milan, Italy, a company of Italy
No Drawing. Filed June 4, 1963, Ser. No. 285,199
Claims priority, application Italy, June 13, 1962, 670,244/62
25 Claims. (Cl. 260—67)

High molecular weight formaldehyde polymers can be prepared by various known processes, for instance, by polymerizing formaldehyde in a chemically inert medium and in the presence of a polymerization initiator such as an aliphatic or aromatic amine (Du Pont USA Patent 2,768,994 and H. Staudinger "Die hochmolekularen organischen Verbindungen," Berlin 1932, pages 280 to 287).

Other known catalysts are trialkyl arsine, stibines and phosphines, the metal carbonyls and organometallic compounds.

It is an object of the present invention to provide a new process for the preparation of thermoplastic high polymers of formaldehyde having good heat solidity and excellent physical properties; the heat stability of the products can be further improved by means of variations in the terminal groups. The new process is characterized in that formaldehyde is treated with a polymerization initiator constituted by a metal derivative of a lactam.

The composition of said initiator can be represented by the following general formula:

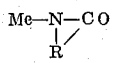

in which Me is an alkali metal of the first group, such as lithium, sodium, potassium, rubidium and caesium; R is a linear or branched hydrocarbon chain having a number of carbon atoms of from 1 to 20.

Examples of compounds intended to be included in the formula reported above, are the derivatives of alkali metals of propiolactam, butyrolactam, valerolactam, caprolactam, onantholactam and laurylolactam.

Said compounds are generally obtainable by direct action of the metal upon the lactam dissolved in an anhydrous organic solvent, as described in literature by L. Ruzicka, Helv. Chim. Acta, 4, 472 (1921) and Hamann, Faserforschung, 5, 224 (1959).

These metal derivatives are insoluble or little soluble in the reaction medium, from which they are separated as they are forming, as a finely dispersed powder.

The polymerization initiators forming a subject-matter of the present invention can be used in any subdivided shape and preferably dispersed in an inert and anhydrous organic solvent, but also in the powdery or supported state.

By the term inert organic solvents are intended the organic liquids chemically inert to formaldehyde such as for instance saturated aliphatic hydrocarbons (butane, hexane, heptane), cycloaliphatic hydrocarbons (cyclohexane), aromatic hydrocarbons (benzene, toluene, xylene), halogentated hydrocarbons (methylene chloride, chloroform, carbon tetrachloride, ethylene dichloride), ethers (diethyl ether, dipropyl ether, dibutyl ether), and esters of saturated acids with saturated alcohols.

Said solvents are used preferably in the anhydrous condition.

The polymerization can take place at temperatures of from −80° C. to 110° C., though for convenience it is preferable to operate at about room temperature.

It is also possible to employ gaseous formaldehyde, or formaldehyde in solution, or in the liquid state, even at temperatures considerably below the boiling point.

The quantity of initiator used in this process may vary within very wide limits, preferably from 0.001 g. to 1 g. of initiator per liter of reaction medium, the upper limit being governed only by criteria of economy.

Said initiators are distinguished by an elevated polymerizing activity; in fact the polymerization is very rapid, and goes to completion in intervals of time of from some minutes to some hours.

The exceptional catalytic activity of this class of initiators seems to be connected with the presence of the bond between the alkali metal and the amidic nitrogen of the cyclic lactam. We have found in fact that the lactam as well as some of its substituted N-alkyl derivatives (e.g. N-methyl and N-ethyl lactam) have a catalytic activity that is nil or comparatively negligible.

In order to attain elevated yields in polymerization it is advisable to use anhydrous or substantially anhydrous formaldehyde, namely formaldehyde having a water content lower than 0.1%.

That can be attained by treating the monomer with a solid drying agent such as alumina-silica gel or by means of partial condensation in cooled coils. The formaldehyde can be obtained by pyrolysis of para-formaldehyde or of alpha-polyoxymethylene, as well as by decomposition of pure trioxane.

An advantage of considerable practical significance of the process here described consists in that the polymerization can be carried out also in the presence of air, whilst, as is known, if tributyl amine is used as an initiator, or an organometallic compound, and in general if operating according to conventional methods, it is necessary to operate in absolutely inert atmosphere. Another advantage consists in that the initiators here described allow polymerization under less critical conditions also with respect to the presence of traces of residual moisture in the system or of other impurities such as acids (for instance formic acid) and carbon dioxide.

The polymerization according to the process of the invention may take place preferably by sending the gaseous formaldehyde, with or without a transporting gas, into a suspension of the initiator in the liquid reaction medium, and keeping the system under intensive stirring.

The speed of introduction of the formaldehyde is continuously checked in the course of polymerization, in such a way that practically all of the formaldehyde is absorbed by the system and there is no gas leakage from the reactor.

In that case there is obtained a nearly complete conversion of the formaldehyde into a high molecular weight polymer.

However this process is not critical, since it is also possible to introduce the formaldehyde into the reactor before or during the introduction of the initiator.

The polymer precipitates in the shape of a fine and compact powder, that does not adhere to the walls of the reactor and appears to be easily discharged. The granular shape of the para-formaldehyde so obtained seems to be tied up to the particular physical shape of the initiator, acting in heterogeneous phase.

After separation of the liquid phase, by means of filtration and centrifugation, the para-formaldehyde is washed with water, then with acetone, and is dried under vacuum.

The polymers of formaldehyde obtained by this process, can be transformed into threads, moulded articles, extruded articles, having valuable properties; and also in the presence of stabilizing agents, antioxidants, fillers and dyes.

They have elevated molecular weights, corresponding to intrinsic viscosities of from 1 to 10, and softening points higher than 170° C. The intrinsic viscosity is determined in a 0.5% solution in parachlorophenol containing 2% of alpha-pinene at 60° C. The softening point is determined at the heating-plate microscope.

*Example 1*

100 g. of commercial paraformaldehyde are decomposed by heating to a maximum temperature of 150° C. and in slow stream of inert gas.

The vapours formed in the pyrolysis are purified by passing through three pipes cooled down to −20° C. and, then, sent continuously at room temperature into a suspension of 0.39 g. of sodium caprolactam in 500 ml. of anhydrous n-hexane.

The polymerization starts immediately. The temperature rises from 22 to 43° C. and the suspension is stirred continuously with a magnetic stirrer.

After 45 minutes' time of reaction, the product obtained is separated by filtration, is washed with boiling water and is dried in vacuo.

65.0 g. of polyformaldehyde are obtained.

Said polymer is transformed into a translucid film by moulding at 180–200° C. with a pressure of about 100 kg./cm.$^2$, and possesses an intrinsic viscosity of 2.40. The melting point at the birefringent microscope is 176° C., while the loss of weight after 20 at 200° C. is 55%.

*Example 2*

200 g. of commercial paraformaldehyde are decomposed and purified as indicated in Example 1.

The resulting gaseous formaldehyde is sent with an inert transporting gas, continuously and at room temperature, into a suspension of 0.46 g. of sodium caprolactam in 500 ml. of anhydrous ethyl ether. The temperature rises in the course of reaction from 22 to 33° C., while the ether removed by the transporting gas is condensed in a refrigerator and reintroduced continuously into the polymerization reactor.

The suspension is continuously stirred with the aid of a magnetic stirrer.

After one hour of reaction, the polymer is separated by filtration, washed and dried, whereby 133 g. of polyformaldehyde having an intrinsic viscosity of 1.02 are obtained.

*Example 3*

200 g. of commercial paraformaldehyde are decomposed at a maximum temperature of 150° C. in a slow stream of air as a transporting gas.

The gases obtained in the pyrolysis are purified from water and from any possible other impurities by passing into a column packed with alumina-silica gel and thermostatized by means of a circulation of liquid at 10° C. The formaldehyde so purified is introduced in a continuous manner into a reactor containing 0.44 g. of sodium-caprolactam in 500 ml. of anhydrous ethyl ether. The temperature rises in the course of polymerization from 22 to 33° C., while the suspension is continuously stirred with the aid of a magnetic stirrer.

After 40 minutes of reaction, 113 g. of polyformaldehyde are obtained having a melting point of 176° C.

*Example 4*

100 g. of commercial paraformaldehyde are subjected to pyrolysis and the gases obtained are purified as described in Example 1.

The purified monomer is sent in continuous manner and with a slow stream of inert transporting gas into a reactor containing 0.35 g. of lithium-caparolactam finely divided and dispersed in 500 ml. of anhydrous n-hexane. The temperature rises in the course of reaction from 22 to 45° C., while the suspension is continuously stirred by means of a magnetic stirrer.

After 1 hour's reaction there are obtained 50 g. of polyformaldehyde, having a melting point of 178° C. and intrinsic viscosity 3.88.

*Example 5*

100 g. of commercial paraformaldehyde are decomposed at a maximum temperature of 150° C. and the formaldehyde monomer obtained is purified as indicated in Example 1.

The monomer is then introduced with a slow gas stream of inert transporting gas and continuously into the polymerization reactor containing a suspension of 0.35 g. of sodium-valero-lactam in 500 ml. of anhydrous n-hexane, and the suspension being well stirred with the aid of a magnetic stirrer.

The temperature rises spontaneously from 23 to 55° C. where it remains for the whole duration of the reaction. After 40 minutes of reaction there are obtained 56 g. of polyformaldehyde having an intrinsic viscosity of 1.22.

We claim:

1. A process for polymerizing formaldehyde to provide an improved thermoplastic high polymer, which comprises contacting gaseous, essentially anhydrous formaldehyde at a temperature between −80° C. and 110° C. with a metallic derivative of a lactam, said derivative being defined by the formula

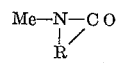

where Me is an alkali metal, and R is a hydrocarbon chain having from 3 to 5 atoms of carbon in the linear chain thereof, said derivative acting as polymerization initiator in said process.

2. The process of claim 1, wherein the said chain has from 4 to 10 atoms of carbon comprised in its linear chain and in at least one branched chain thereof.

3. The process of claim 1, wherein the said metallic derivative is caused to contact the formaldehyde in a finely divided form.

4. The process of claim 3, wherein the said finely-divided metallic derivative is dispersed in an organic solvent chemically inert to formaldehyde and essentially anhydrous.

5. The process of claim 4, wherein the said solvent is selected from the group consisting of n-hexane and ethyl ether.

6. The process of claim 4, wherein said organic solvent is selected from the group consisting of saturated aliphatic hydrocarbons having a number of carbon atoms ranging from 5 to 10.

7. The process of claim 4, wherein said organic solvent is selected from the group consisting of cycloaliphatic hydrocarbons with a number of carbon atoms ranging from 4 to 9.

8. The process of claim 4, wherein said organic solvent is selected from the group consisting of benzene, toluene and xylene.

9. The process of claim 4, wherein said organic solvent is selected from the group consisting of methylene chloride, chloroform, carbon tetrachloride, and ethylene dichloride.

10. The process of claim 4 wherein the said divided metallic derivative is dispersed in the solvent in a quantity between .001 and 1 g. per liter of solvent.

11. A process for polymerizing formaldehyde to provide an improved thermoplastic high polymer, which comprises contacting gaseous essentially anhydrous formaldehyde at a temperature between −80° C. and 110° C. with a metallic derivative of a lactam, said derivative being defined by the formula

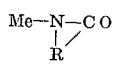

wherein Me is an alkali metal selected from the group consisting of sodium and lithium, and R is a linear hydrocarbon radical having from 3 to 5 atoms of carbon.

12. The process of claim 11, wherein the said metallic derivative is caused to contact the formaldehyde in finely divided shape.

13. The process of claim 12, wherein the said finely divided metallic derivative is dispersed in an organic solvent chemically inert to formaldehyde and essentially anhydrous.

14. The process of claim 12 wherein the said divided metallic derivative is dispersed in the solvent in a quantity between .001 and 1 gr. per liter of solvent.

15. The process of claim 13, wherein the said solvent is selected from the group consisting of n-hexane and ethyl ether.

16. The process of claim 13, wherein said organic solvent is selected from the group consisting of saturated aliphatic hydrocarbons having a number of carbon atoms ranging from 5 to 10.

17. The process of claim 13, wherein said organic solvent is selected from the group consisting of cycloaliphatic hydrocarbons with a number of carbon atoms ranging from 4 to 9.

18. The process of claim 13, wherein said organic solvent is selected from the group consisting of benzene, toluene and xylene.

19. The process of claim 13, wherein said organic solvent is selected from the group consisting of methylene chloride, chloroform, carbon tetrachloride, and ethylene dichloride.

20. A process for polymerizing formaldehyde to provide an improved thermoplastic high polymer, which comprises contacting formaldehyde with a metallic derivative of a lactam, said derivative being defined by the formula

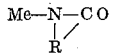

wherein Me is an alkali metal, and R is a linear hydrocarbon radical having from 3 to 5 atoms of carbon in the linear chain thereof, said derivative acting as polymerization initiator in said process.

21. The process of claim 20 wherein the said radical R has from 4 to 10 atoms of carbon comprised in its linear chain and in at least one branched chain thereof.

22. The process of claim 20 wherein the said metallic derivative is caused to contact the formaldehyde in a finely divide shape.

23. The process of claim 22 wherein said finely divided metallic derivative is dispersed in an anhydrous organic solvent chemically inert to formaldehyde.

24. The process of claim 23 wherein said anhydrous organic solvent is selected from the group consisting of saturated aliphatic hydrocarbons having a number of carbon atoms ranging from 5 to 10.

25. A process for polymerizing formaldehyde to provide an improved thermoplastic high polymer which comprises contacting formaldehyde at a temperature between −80° C. and 110° C. with a metallic derivative of a lactam, said derivative being defined by the formula

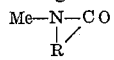

wherein Me is an alkali metal and R is a linear hydrocarbon radical having from 3 to 5 atoms of carbon in the chain thereof.

References Cited by the Examiner

UNITED STATES PATENTS

| | | | |
|---|---|---|---|
| 2,727,017 | 12/1955 | Berthold | 260—78 |
| 2,806,848 | 9/1957 | Nedwich | 260—239.3 |
| 2,844,561 | 7/1958 | Bechtold et al. | 260—67 |
| 3,017,392 | 1/1962 | Butler et al. | 260—78 |

FOREIGN PATENTS

| | | |
|---|---|---|
| 875,722 | 8/1961 | Great Britain. |
| 1,008,978 | 11/1965 | Great Britain. |
| 1,258,364 | 3/1961 | France. |

OTHER REFERENCES

Whitmore, Organic Chemistry, D. Van Nostrand Co., 1951, pages 502–504, QD 251W51951.

SAMUEL H. BLECH, *Primary Examiner.*

WILLIAM H. SHORT, *Examiner.*

L. M. MILLER, *Assistant Examiner.*